Patented June 22, 1954

2,681,931

UNITED STATES PATENT OFFICE 2,681,931

BASIC AMIDES OF BICYCLO [2.2.1]-5-HEPTENE-2-CARBOXYLIC ACID AND 2-NORCAMPHANECARBOXYLIC ACID AND DERIVATIVES THEREOF

William W. Jenkins, Wilmette, Ill., assignor to G. D. Searle & Co., Chicago, Ill., a corporation of Illinois No Drawing. Application December 7, 1951,
Serial No. 260,575

11 Claims. (Cl. 260—557)

The present invention relates to a new group of basic amides of polycarbocyclic acids, and, particularly to the basic amides of bicyclo[2.2.1]-5-heptene-2-carboxylic acid and 2-norcamphanecarboxylic acid and their derivatives. The amides which constitute this invention are represented by the bases of the following general structural formula

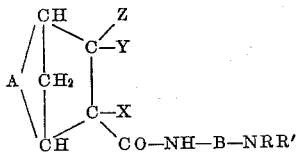

and salts thereof, wherein A is either an ethylene or a vinylene group, B is a lower bivalent aliphatic hydrocarbon radical containing at least 2 carbon atoms, X and Y are either hydrogen or lower alkyl radicals, Z is either a hydrogen, lower alkyl, or phenyl radical, and NRR' is either a lower dialkylamino group or a nitrogen containing heterocyclic group attached to the radical B through a nitrogen in the heterocycle.

In the foregoing structural formula the radical B is derived from such straight-chained, or branch-chained aliphatic hydrocarbon radicals as ethylene, propylene, butylene, amylene, and hexylene, or a polymethylene radical such as trimethylene, tetramethylene, pentamethylene, and hexamethylene.

The radicals R and R' can be lower alkyl groups such as methyl, ethyl, and straight-chained and branch-chained propyl, butyl, amyl, and hexyl groups. The radical NRR' can also be a nitrogen-containing lower heterocycle such as a morpholino, pyrrolidino, piperidino, 2,5-dimethylpyrrolidino, 2,6-lupetidino, piperazino, N'-alkylpiperazino, thiamorpholino, quinolino, and isoquinolino radical.

The radicals X, Y, and Z can be hydrogen or lower alkyl radicals and, in addition, Z can be a lower aryl radical.

The organic bases described herein form salts with a variety of inorganic and strong organic acids, including sulfuric, phosphoric, hydrochloric, hydrobromic, hydriodic, sulfamic, citric, lactic, maleic, malic, succinic, tartaric, cinnamic, acetic, benzoic, gluconic, oxalic, ascorbic, and related acids. They also form quaternary isoquinolinium salts with a variety of organic esters of sulfuric, hydrohalic, and aromatic sulfonic acids. Among such esters are methyl chloride, bromide and iodide; ethyl chloride, propyl chloride, butyl chloride, isobutyl chloride, benzyl chloride, phenethyl chloride, naphthylmethyl chloride, dimethyl sulfate, methyl benzenesulfonate, ethyl toluenesulfonate, ethylene chlorohydrin, propylene chlorohydrin, allyl bromide, methallyl bromide, and crotyl bromide.

The bicyclo [2.2.1]-5-heptene - 2 - carboxylic acids and their alkylation and their 2- and 3-substitution products (in which A is vinylene) are prepared by a Diels-Alder addition of a compound of the type

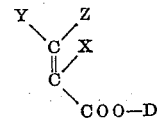

wherein D is hydrogen or a lower alkyl group and the other symbols are defined as hereinabove, to cyclopentadiene as described by Alder et al., Annalen der Chemie, vol. 514, pages 197 et seq., 1934; and by Fiesselmann, Berichte deut. chem. Ges., vol. 75, pages 881 et seq., 1942. The acids are then converted into the acid halides and the latter reacted with a compound of the type.

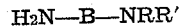

to form the desired amides.

The derivatives of 2-norcamphanecarboxylic acid are obtained by hydrogenating the bicyclo-[2.2.1]-5-heptene-2-carboxylic acids in the presence of a catalyst such as Raney nickel or palladium, conversion of the resulting acids to the acid halides and the reaction with a suitable amine.

The amides which constitute the subject of the present invention are valuable intermediates in organic synthesis. The addition salts are of special interest as medicinal agents because of their effects on the cardio-vascular and renal systems. The quaternary ammonium salts are of special value because of their inhibitory effect on the autonomic nervous systems.

My invention will appear in further detail from the following examples which are set forth for the purpose of illustrating the invention but are in no way to be construed as limiting it in spirit or in scope. It will be apparent to those skilled in the art that many modifications in materials, methods, and conditions can be adopted without departing from the scope of this invention. In these examples temperatures are given uncorrected in degrees centigrade (° C.), pressures during vacuum distillation in millimeters (mm.) of mercury, and quantities of materials in parts by weight.

EXAMPLE 1

*N-(β-diethylaminoethyl)-bicyclo[2.2.1]-5-heptene-2-carboxamide*

A mixture of 250 parts of bicyclo[2.2.1]-5-heptene-2-carboxylic acid, 220 parts of thionyl chloride, and 150 parts of pyridine in 1300 parts of benzene is heated at reflux temperature for 90 minutes, cooled and filtered. To the filtrate, containing a solution of the bicyclo[2.2.1]-5-heptene-2-carboxylic acid chloride, 210 parts of β-aminoethyl-diethylamine are added and the mixture is heated at reflux temperature for 5 hours, after which the solvent is stripped and the residue is extracted with water. The aqueous solution is washed with ether, rendered alkaline by the addition of sodium hydroxide and extracted with ether. The ether extract is dried over anhydrous potassium carbonate, filtered and evaporated. Distillation of the residue at about 139–141° C. and 0.8–1.0 mm. pressure yields the N-(β-diethylaminoethyl)-bicyclo[2.2.1]-5-heptene-2-carboxamide.

224 parts of the base thus obtained are dissolved in 3000 parts of anhydrous ether and treated with one equivalent of a 25% solution of hydrogen chloride in absolute alcohol. Upon chilling the white hydrochloride precipitates which is very hygroscopic. It has the structural formula

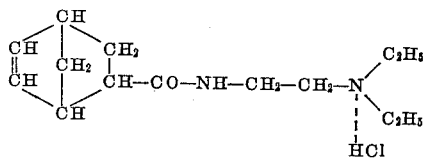

EXAMPLE 2

*N-(β-diethylaminoethyl)-2-norcamphanecarboxamide*

A solution of 150 parts of 2-norcamphanecarboxylic acid, 131 parts of thionyl chloride, 86 parts of pyridine, and 900 parts of benzene is heated at reflux temperature for 90 minutes, cooled and filtered. To the filtrate, containing the 2-norcamphanecarboxylic acid chloride, 124 parts of β-aminoethyldiethylamine are added and the solution is heated at reflux temperature for 6 hours. After concentration in vacuum the residue is extracted with water and the extract is washed with ether, rendered alkaline by addition of potassium hydroxide and extracted with ether. This ether extract is dried over anhydrous calcium sulfate, filtered and evaporated. The N-(β-diethylaminoethyl)-2-norcamphanecarboxamide thus obtained is distilled at about 132–134° C. and 0.5 mm. pressure.

A solution of this base in absolute ether is treated with a 25% solution of hydrogen chloride in anhydrous 2-propanol. The hygroscopic hydrochloride melts at about 90–94° C. It has the structural formula

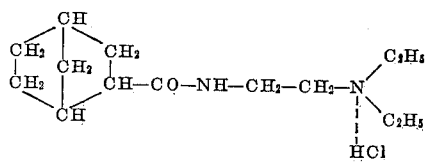

EXAMPLE 3

*N-(β-diethylaminoethyl)-2-methyl-bicyclo[2.2.1]-5-heptene-2-carboxamide*

A mixture of 300 parts of 2-methyl-bicyclo[2.2.1]-5-heptene-2-carboxylic acid, 235 parts of thionyl chloride, 156 parts of pyridine, and 900 parts of benzene is heated at reflux temperature for 90 minutes, cooled and filtered. To the filtrate, containing the 2-methyl-bicyclo[2.2.1]-5-heptene-2-carboxylic acid chloride, 230 parts of β-aminoethyldiethylamine are added cautiously and the solution is heated at reflux temperature for 6 hours. The solvent is stripped off and the residue extracted with water. The aqueous solution is washed with ether, rendered alkaline by addition of ammonium hydroxide, and extracted with ether. This ether extract is dried over anhydrous potassium carbonate, filtered and evaporated, leaving an oily residue which is distilled at about 128–130° C. and 0.4–0.5 mm. pressure.

415 parts of the N-(β-diethylaminoethyl)-2-methyl-bicyclo[2.2.1]-5-heptene-2-carboxamide are dissolved in 6000 parts of anhydrous ether and treated with one equivalent of an absolute alcoholic solution of hydrogen chloride. The resulting oil solidifies on chilling. Upon recrystallization from anhydrous ethyl acetate the somewhat hygroscopic, white hydrochloride melts at about 119–119.5° C. The salt has the structural formula

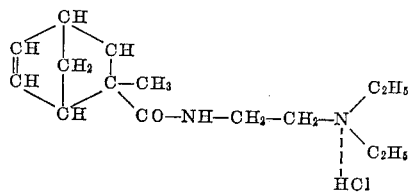

EXAMPLE 4

*N-(β-diethylaminoethyl)-2-methyl-2-norcamphanecarboxamide*

A mixture of 180 parts of 2-methyl-2-norcamphanecarboxylic acid, 139 parts of thionyl chloride, 93 parts of pyridine, and 900 parts of benzene is heated at reflux temperature for 2 hours, cooled and filtered. To the filtrate, containing the 2-methyl-2-norcamphanecarboxylic acid chloride, 136 parts of β-aminoethyldiethylamine are added and the resulting solution is heated at reflux temperature for 5 hours, after which the solvent is stripped off and the residue is extracted with water. The aqueous solution is washed with ether, rendered alkaline by addition of sodium hydroxide and extracted with ether. The ether extract is dried over anhydrous potassium carbonate, filtered and evaporated to yield the N-(β-diethylaminoethyl)-2-methyl-2-norcamphanecarboxamide which is distilled at about 144–146° C. and 1.4 mm. pressure. It has the structural formula

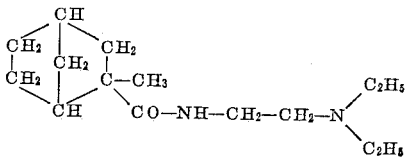

EXAMPLE 5

*N-(β-diethylaminoethyl)-3-methyl-bicyclo[2.2.1]-5-heptene-2-carboxamide*

A mixture of 250 parts of 3-methyl-bicyclo[2.2.1]-5-heptene-2-carboxylic acid, 196 parts of thionyl chloride, 130 parts of pyridine and 900 parts of benzene is heated at reflux temperature for 90 minutes, cooled and filtered. To the filtrate, containing the 3-methyl-bicyclo[2.2.1]-

5-heptene-2-carboxylic acid chloride, are added 191 parts of β-aminoethyldiethylamine and the resulting solution is heated at reflux temperature for 5 hours, after which the solvent is stripped off and the residue is extracted with water. After washing with ether, the aqueous solution is rendered alkaline by addition of sodium hydroxide and extracted with ether. The ether extract is dried over anhydrous potassium carbonate, filtered and evaporated to yield the N - (β - diethylaminoethyl) - 3 - methyl-bicyclo-[2.2.1]-5-heptene-2-carboxamide which is distilled at about 142–145° C. and 1.1 mm. pressure.

An absolute ether solution of this base is treated with one equivalent of a 25% solution of hydrogen chloride in absolute 2-propanol, and the resulting white precipitate is recrystallized from absolute ethyl acetate. The hydrochloride which melts at about 99–100° C. has the structural formula

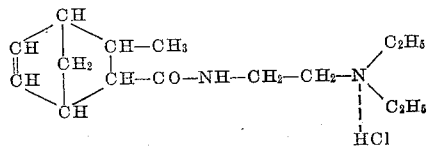

EXAMPLE 6

*N-(β-diethylaminoethyl)-3-methyl-2-norcamphanecarboxamide*

A mixture of 150 parts of 3-methyl-2-norcamphanecarboxylic acid, 116 parts of thionyl chloride, 77 parts of pyridine, and 900 parts of benzene is heated at reflux temperature for 100 minutes, cooled and filtered. To the filtrate, containing a solution of the 3-methyl-2-norcamphanecarboxylic acid chloride, are added 113 parts of β-aminoethyldiethylamine and the resulting solution is heated at reflux temperature for 5.5 hours, after which it is concentrated and extracted with water. The aqueous extract is washed with ether, rendered alkaline by addition of sodium hydroxide, and extracted with ether. This ether extract is dried over anhydrous calcium sulfate, filtered and evaporated to yield the N-(β-diethylaminoethyl)-3-methyl-2-norcamphanecarboxamide which is distilled at about 147–150° C. and 1.2 mm. pressure.

To a solution of 201 parts of this base in 3000 parts of absolute ether is added one equivalent of a 25% solution of hydrogen chloride in anhydrous 2-propanol. The white precipitate is washed with ether, dried, and recrystallized from anhydrous ethyl acetate. The hydrochloride melts at about 82–85° C. and has the structural formula

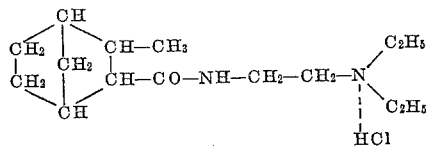

EXAMPLE 7

*N-(δ-dimethylaminobutyl)-2,3-diethyl-2-norcamphenecarboxamide*

A mixture of 100 parts of 2,3-diethyl-2-norcamphenecarboxamide, 61 parts of thionyl chloride, 41 parts of pyridine, and 400 parts of benzene is heated at reflux temperature for 2 hours, cooled and filtered. To the filtrate, containing the 2,3-diethyl-2-norcamphenecarboxylic acid chloride, are added 60 parts of δ-aminobutyldimethylamine and the solution is heated at reflux temperature for 7 hours. The solvent is stripped off in vacuum and the residue taken up in water. The aqueous solution is washed with ether, rendered alkaline by addition of potassium hydroxide and extracted with ether. This ether extract is dried over anhydrous calcium sulfate, stirred with decolorizing charcoal, filtered and evaporated. The N-(δ-dimethylaminobutyl) - 2,3 - diethy - 2 - norcamphanecarboxamide is distilled at about 152–158° C. and about 0.4 mm. pressure. The yellowish oil has the structural formula

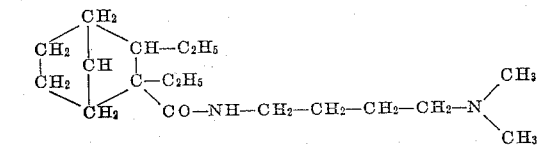

EXAMPLE 8

*N-(γ-diisopropylaminopropyl)-3,3-dimethyl-bicyclo[2.2.1]-5-heptene-2-carboxamide*

A mixture of 332 parts of 3,3-dimethyl-bicyclo-[2.2.1]-5-heptene-2-carboxamide, 240 parts of thionyl chloride, 158 parts of pyridine, and 1500 parts of benzene is heated at reflux temperature for 2 hours, cooled and filtered. To the filtrate, containing the 3,3 - dimethylbicyclo[2.2.1] - 5-heptene-2-carboxylic acid chloride, are added 316 parts of γ-aminopropyldiisopropylamine and the mixture is heated at reflux temperature for 10 hours, concentrated in vacuum, and extracted with ether. After washing with ether, the aqueous solution is rendered alkaline by addition of sodium hydroxide and extracted with ether. The ether extract is dried over anhydrous potassium carbonate, stirred with decolorizing charcoal, filtered and evaporated to leave the oily N - (γ - diisopropylamino - proply) - 3,3 - dimethyl - bicyclo[2.2.1]-5-heptene-2-carboxamide which is distilled at about 157–161° C. and 0.4–0.6 mm. pressure. The clear, yellowish oil has the structural formula:

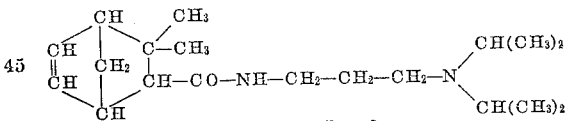

EXAMPLE 9

*N-(γ-di-n-butylaminopropyl)-3-phenyl-bicyclo-[2.2.1]-5-heptene-2-carboxamide*

A mixture of 640 parts of 3-phenyl-bicyclo-[2.2.1]-5-heptene-2-carboxylic acid, 356 parts of thionyl chloride, 240 parts of pyridine, and 3000 parts of toluene is heated at reflux temperature for 2 hours, cooled and filtered. The filtrate, containing the 3-phenyl-bicyclo-[2.2.1]-5-heptene-2-carboxylic acid chloride, is treated with 560 parts of γ-aminopropyldibutylamine and heated at reflux temperature for 9 hours. After concentration in vacuum the residue is extracted with water and the aqueous extract is washed with ether, rendered alkaline by addition of sodium hydroxide, and extracted with ether. This ether extract is dried over anhydrous calcium sulfate, stirred with decolorizing charcoal, filtered and evaporated to yield the N-(γ-di-n-butylaminopropyl) - 3 - phenyl - bicyclo - [2.2.1] - 5-heptene-2-carboxamide as a clear, amber oil which has the structural formula

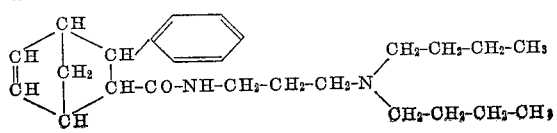

I claim:
1. An amide of the structural formula

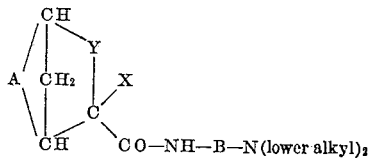

wherein A is a member of the class consisting of ethylene and vinylene, B is a lower alkylene radical separating the two nitrogen atoms by at least two carbon atoms, X is a member of the class consisting of hydrogen and lower alkyl radicals and Y is a member of the class consisting of the methylene radical, —CH(lower alkyl)- radicals and, in the case where X is a hydrogen radical, —C(lower alkyl)$_2$- and —CH(phenyl)- radicals.

2. A di-(lower) alkylamino-(lower) alkyl-bicyclo[2.2.1]-5-heptene-2-carboxamide, wherein the two nitrogen atoms are separated by at least two carbon atoms.

3. A lower N-dialkylaminoalkyl-2-(lower)-alkyl-bicyclo[2.2.1]-5-heptene-2-carboxamide of the structural formula

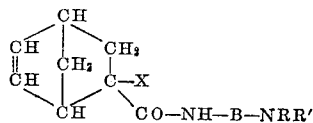

wherein B is a lower alkylene radical separating the two nitrogen atoms by at least two carbon atoms, and R, R', and X are lower alkyl radicals.

4. A lower N - dialkylaminoalkyl - 3 - (lower) alkyl-bicyclo[2.2.1]-5-heptene-2-carboxamide of the structural formula

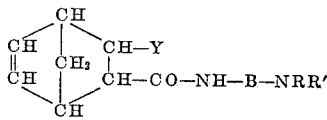

wherein B is a lower alkylene radical separating the two nitrogen atoms by at least two carbon atoms, and R, R', and Y are lower alkyl radicals.

5. A di-(lower) alkylamino-(lower)alkyl-2-norcamphenecarboxamide, wherein the two nitrogen atoms are separated by at least two carbon atoms.

6. A lower N-dialkylaminoalkyl-3-(lower)-alkyl-2-norcamphanecarboxamide of the structural formula

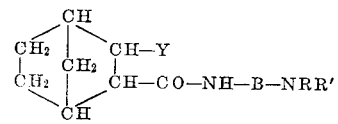

wherein B is a lower alkylene radical separating the two nitrogen atoms by at least two carbon atoms, and R, R', and Y are lower alkyl radicals.

7. N - ($\beta$ - diethylaminoethyl) - bicyclo[2.2.1]-5-heptene-2-carboxamide.

8. N-($\beta$-diethylaminoethyl)-2-methyl-bicyclo[2.2.1]-5-heptene-2-carboxamide.

9. N-($\beta$-diethylaminoethyl)-3-methyl-bicyclo[2.2.1]-5-heptene-2-carboxamide.

10. N-($\beta$-diethylaminoethyl)-2-norcamphanecarboxamide.

11. N-($\beta$-diethylaminoethyl)-3-methyl-2-norcamphanecarboxamide.

References Cited in the file of this patent
UNITED STATES PATENTS

| Number | Name | Date |
| --- | --- | --- |
| 2,338,178 | Graenacher et al. | Jan. 4, 1944 |